United States Patent [19]

Ito et al.

[11] Patent Number: 5,705,214
[45] Date of Patent: Jan. 6, 1998

[54] FOOD COMPONENT TRANSFER SHEET AND METHOD OF PROCESSING FOOD THEREWITH

[75] Inventors: Tomio Ito, Mino; Tomoyoshi Nomi, Kobe; Shingo Watanabe, Hyogo, all of Japan

[73] Assignee: Osaka Kagaku Gokin Co., Ltd., Hyogo, Japan

[21] Appl. No.: 356,171

[22] PCT Filed: Mar. 14, 1994

[86] PCT No.: PCT/JP94/00405

§ 371 Date: Dec. 16, 1995

§ 102(e) Date: Dec. 16, 1995

[51] Int. Cl.$^6$ .................. A22C 13/00; B65D 81/34
[52] U.S. Cl. .................. 426/135; 426/132; 426/106; 426/129; 426/105; 426/412; 426/415; 426/523
[58] Field of Search .................. 426/132, 135, 426/106, 105, 126, 127, 112, 129, 412, 415; 383/70, 71, 107, 109; 53/138.2, 138.4, 483

[56] References Cited

U.S. PATENT DOCUMENTS

| | | | |
|---|---|---|---|
| 2,357,258 | 8/1944 | Harris | 426/112 |
| 2,759,830 | 8/1956 | Touceda | 426/132 |
| 2,902,371 | 9/1959 | Shorr | 426/132 |
| 3,340,089 | 9/1967 | Bougie | 426/106 |
| 3,432,980 | 3/1969 | Seiferth et al. | 383/71 |
| 3,620,774 | 11/1971 | Ford et al. | 426/106 |
| 3,689,291 | 9/1972 | Draper | 426/113 |
| 3,780,488 | 12/1973 | Herrell | 383/71 |
| 4,478,858 | 10/1984 | Baird et al. | 426/106 |

FOREIGN PATENT DOCUMENTS

| | | | |
|---|---|---|---|
| 408164 | 1/1991 | European Pat. Off. | 426/132 |
| 1206047 | 9/1970 | United Kingdom | 426/106 |

*Primary Examiner*—Steven Weinstein
*Attorney, Agent, or Firm*—Larson & Taylor

[57] ABSTRACT

The food component transfer sheet of this invention comprises
(i) a water- and heat-resistant base sheet in the form of a continuous ribbon extending in one direction,
(ii) a layer of granules, powders and/or chips of a food component to be transferred as disposed repeatedly along the length of said ribbon with a ligation interval between repeats, and
(iii) a glue layer made of an edible water-soluble macromolecular substance as disposed between said base sheet and said food component layer.

Casings fabricated from this food component transfer sheet can be easily gathered and mechanically clipped with the same clips as used for conventional casings so that the production of ham and other food items is greatly facilitated.

7 Claims, 6 Drawing Sheets

FOOD COMPONENT TRANSFER SHEET AND METHOD OF PROCESSING FOOD THEREWITH

FIELD OF THE INVENTION

This invention relates to a food component transfer sheet which can be used with advantage in the seasoning or flavoring of food in the course of production of food items such as ham, roast pork, sausages, cheese and kamaboko.

BACKGROUND ART

The conventional process of producing an animal meat or fish meat product, e.g. ham, sausage, etc., which has been clad with spices and/or other condiments starts with a step of filling a fibrous casing with salted or otherwise seasoned meat and freezing the filled casing for shaping. The above step is followed by a step of peeling the casing from the shaped meat, a step of applying spices and the like to the surface of the meat and wrapping the spiced meat in a cellophane wrapper, and a step of placing the wrapped meat in a retainer and cooking the same. Thus, the production process for spiced food items is complicated and so time- and labor-consuming that the costs of production are inevitably high.

An alternative known process for cladding such a food with an assortment of spices comprises filling a fibrous casing with seasoned meat, cooking it, peeling the casing off to expose the meat, applying a solution of gelatin to the surface of the meat and letting the desired species adhere to the food. However, this process is still poorer in workability than the first-mentioned method.

Meanwhile, among cooked foods inclusive of various delicacies, there is known a class of food items each comprising a core of cheese or kamaboko (a molded fish meat paste) and a cladding made of e.g. a fish meat paste. Such a food item is produced by a process which comprises molding cheese or the like and cladding the molding with an independent sheet made of a fish meat paste but this process is disadvantageous in that the procedure involved is not only complicated but provides for only a poor adhesion between the core food and the cladding.

The inventors of this invention did much research to develop a technology by which spice-coated animal meat or fish meat products such as spiced ham and sausages can be easily produced. As a result, they previously proposed a food component transfer sheet comprising a water-resistant base film and a granular or powdery food component, such as a mixture of spices, as glued to said base film with the aid of an edible adhesive and a method of producing ham, sausages and so on using the same transfer sheet (EP-A-408164, with intention to grant, Australian Patent 614456). For the production of a spice-clad ham using the above food component transfer sheet, a tubular casing is first fabricated by the center sealing of a flat film or sheet. As a step preparatory to cooking, one end of this center-sealed casing is first closed (primary ligation) and after the casing is filled with meat (the body of food), the other end of the casing is closed (secondary ligation) in such a manner that the contents will be retained in tightly packed condition. The filled and ligated casing is now subjected to cooking.

The thickness of the base film used for the ordinary plastic casing for the production of ham and sausages is in the range of about 30–80 μm and the end ligations can be easily accomplished on a machine using aluminum clips. However, the above-mentioned food component transfer sheet carrying a spice layer is as thick as 500–1500 μm so that even gathering prior to ligation (clipping) is very difficult. Moreover, the conventional mechanical ligation using aluminum clips cannot be performed and manual ligation using strings is essential.

The object of this invention is to provide a food component transfer sheet constituting a food casing which enables a simple mechanical ligation as does the ordinary casing.

DISCLOSURE OF INVENTION

This invention provides a food component transfer sheet comprising (i) a water- and heat-resistant base sheet in the form of a continuous ribbon extending in one direction, (ii) a layer comprising granules, powders and/or chips of a food component to be transferred as disposed repeatedly in the lengthwise direction of the base sheet leaving a predetermined ligation interval between repeats, and (iii) a glue layer formed from an edible water-soluble macromolecular material as disposed between said base sheet and food component layer.

In a further aspect, this invention provides a process for producing a food which comprises (i) covering a body of seasoned food with a unit segment of said food component transfer sheet as provided by cutting the sheet in ligation intervals, (ii) ligating the unit sheet segment in the ligation intervals with clips to thereby package the food in such a manner that the body of food is retained in tightly packed condition, (iii) exposing the resulting package to a humid hot environment, and (iv) peeling the base sheet of said unit segment from the body of food.

BRIEF DESCRIPTION OF THE DRAWINGS

FIG. 7 (a)–(d) are photographs showing the ligated parts of various food component transfer sheets.

DETAILED DESCRIPTION OF THE INVENTION

The food component transfer sheet of this invention is now described in detail with reference to the accompanying drawings.

Figure 1:
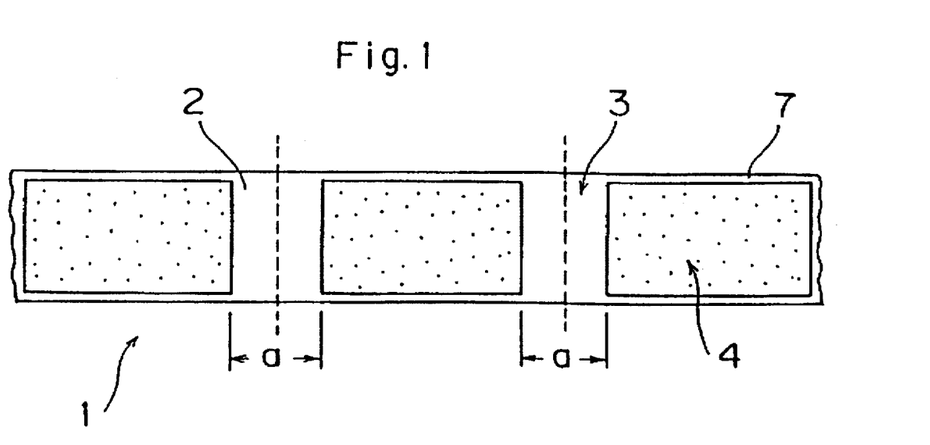
FIG. 1 is a plan view showing a food component transfer sheet of this invention.
Figure 2:
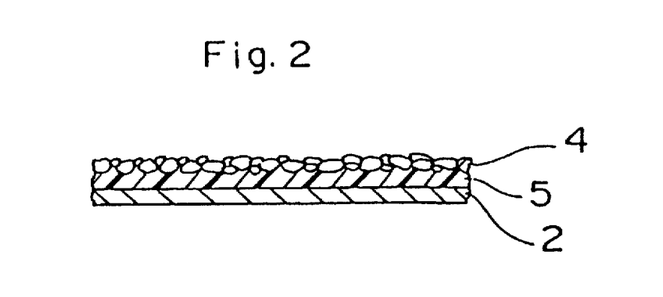
FIG. 2 is a schematic cross-section view showing the food component transfer sheet of this invention.

As shown in FIG. 1, the food component transfer sheet of this invention, generally indicated at 1, comprises a continuous ribbon of base sheet 2 extending in one direction and a food component layer 4 disposed repeatedly on said base sheet 2 leaving a ligation interval 3 of predetermined dimension a between repeats. This food component layer 4 is made up of a granular, powdery or chip-shaped food component and, as illustrated in FIG. 2, glued to said base sheet 2 through a glue layer 5. It is sufficient that this food component layer 4 is just large enough to cover the outer surface of a body of food (for example, meat) disposed therein in the cooking operation, and optionally a lateral margin 7 free of the food component layer 4 may be provided along either edge of the base sheet 2 to facilitate sealing for the fabrication of the casing.

The respective constituent parts of the food component transfer sheet of this invention are now described in further detail.

(i) The Base Sheet

The base sheet of the food component transfer sheet 1 of this invention is a sheet or film which is resistant to both water and heat and has a sufficient strength to retain the contents under sufficient tension at a cooking temperature (about 40°–180° C., particularly 50°–140° C.). Such film or sheet includes the papers and nonwoven fabrics made of natural fibers (plant fibers, animal fibers, mineral fibers), semi-synthetic fibers (rayon, cellulose acetate and other fibers) and/or synthetic fibers (polyester, nylon and other plastic fibers), woven or knitted fabrics of such fibers or combinations of fibers, and synthetic resin sheets or films such as polyethylene, polypropylene, polyethylene terephthalate and other sheets or films. The base sheet may also be a paper-like sheet prepared by compressing a synthetic resin foam.

As the base sheet for the food component transfer sheet of this invention, either a gas-permeable sheet or an impervious sheet can be judicially chosen according to the type of food to be processed. For example, when the body of food is a substance of high moisture content, such as meat, the base sheet is preferably a gas-permeable sheet so that the water vapor produced in cooking or sterilization may be dissipated off. Such base sheet includes a viscose-coated paper made predominantly of manila hemp fiber and a porous heat-resistant film of, for example, polyethylene terephthalate having a multiplicity of perforations formed by needling, discharge treatment or other technique. On the other hand, when the body of food to be processed is a substance of comparatively low moisture content and having a melting temperature of about 60°–70° C. at the maximum, such as processed cheese, an impervious sheet is preferably chosen for minimizing the loss of the contents. Such base sheet may for example be a heat-resistant polyethylene terephthalate or equivalent film.

(ii) The Food Component

The food component to be transferred to the body of food includes powders of various spices such as pepper, Chinese pepper, siso, Japanese papper, horse raddish, etc.; chips or powders of laver, tangle, minced fish meat, etc.; fish roe, such as salted Alaska pollack roe, pappered pollack roe, etc. or powders thereof; powdered dairy products such as Parmesan, yoghourt, etc.; dry powders of various extracts such as fish meat extract, animal meat extract, plum pulp extract, vegetable extract and so on. These materials can be used independently or in admixture. The morphology of such food component is preferably a finely divided solid, for example powders, granules, chips, etc.

(iii) The Glue

The glue is preferably an edible water-soluble macromolecular substance that can be used in foodstuffs. The glue as such includes natural polysaccharides such as starch, modified starch, dextran, guar gum, tragacanth gum, xanthine gum, gum arabic, pullulan, Queensland gum, etc.; synthetic glues such as carboxymethylcellulose sodium, carboxymethylstarch, etc., gelatin and so on. These glues are melted or fused by moisture and heat in the cooking step so that the food component layer of the base sheet is transferred to the surface of the body of food.

(iv) The Process for Manufacturing a Food Component Transfer Sheet

Figure 3:
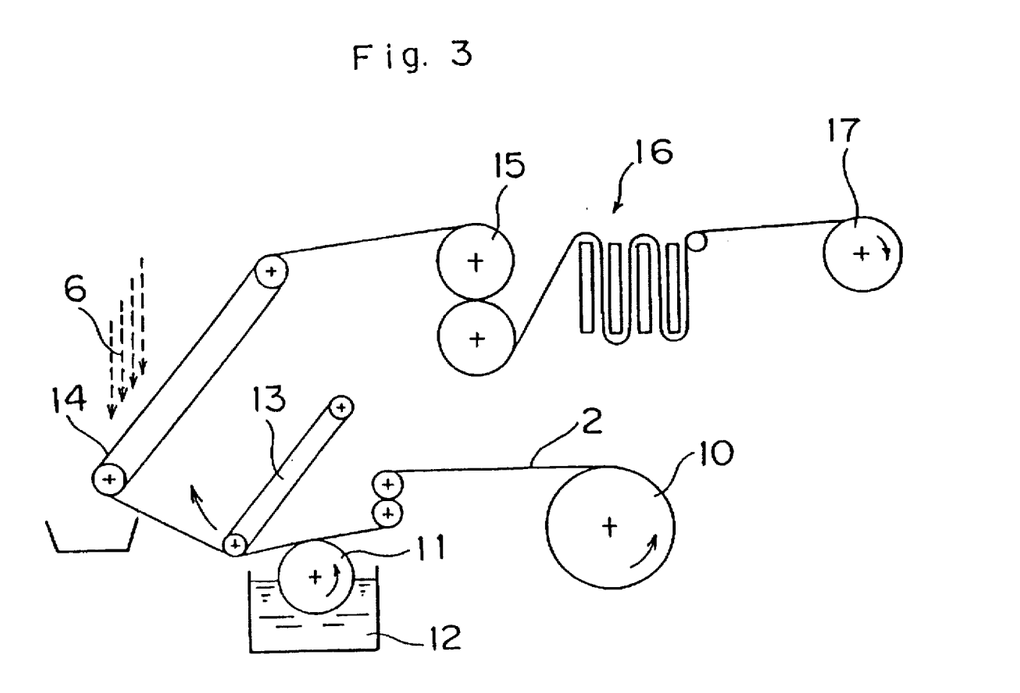
FIG. 3 is a flow diagram showing the procedure of producing the food component transfer sheet.

FIG. 3 is a flow diagram showing a specific example of the manufacturing process of this invention for the food component transfer sheet. As shown in FIG. 3, a base sheet 2 is paid out from a roll 10 and passed over a coating roller 11 revolving in partial immersion in a glue solution 12, whereby it is coated with the glue solution 12. The base sheet 2 coated with the glue solution 12 travels via a guide 13 to a food component depositor 14. It is so arranged that the base sheet 2 is allowed to contact the coating roller 11 while said guide 13 is in a lowered position so that the sheet 2 is coated with said glue solution 12. On the other hand, the base sheet 2 departs from the coating roller 11 and, hence, the application of the glue solution 12 does not occur when said guide 13 is displaced into a raised position for a predetermined time. In this manner, the glue application time and interval can be controlled by adjusting the position of the guide 13.

The base sheet 2 further travels through a food component depositor 14 in an upwardly inclined path and, in the course of this travel, the food component 6 which may for example be a mixture of spices is dusted over the base sheet 2. The food component 6 is selectively deposited on the area coated with the glue solution to form a food component layer 4. The food component 6 not adhering to the base sheet 2 falls off from the base sheet 2 and is reclaimed. In this manner, the food component layer 4 is cyclically or repeatedly deposited leaving a ligation interval 3 of predetermined dimension between repeats, on the base sheet 2.

The base sheet thence travels over press rollers 15, whereby the food component is fully integrated with the base sheet 2. The resulting assembly is dried by a dryer means 16 utilizing a hot air current and/or infrared radiation, and finally taken up on a roll 17.

In the arrangement shown in FIG. 3, the guide 13 is driven up and down as a means for adjusting the length of the food component layer 4 and the length of said interval for ligation 3 but this arrangement is not an exclusive choice. Thus, the glue application area and the glue-free area can be freely controlled to form a food component layer and a ligation interval in a desired pattern by various electrical or mechanical means, for example by lowering the coating roller 11 out of contact with the base sheet 2 according to a predetermined time schedule. It is also possible to apply the glue solution constantly and dust the food component over the base sheet on an intermittent basis.

The food component transfer sheet thus obtained is put to use in a flat form or after shaping into a tubular form. Particularly for the production of ham, sausages, kamaboko bars, cheese bars, etc., the transfer sheet is preferably shaped into a tubular form beforehand. The shaping of the food component transfer sheet of this invention into a tubing can be carried out by fusion-bonding, bonding with an adhesive tape, or sewing depending on the type of base sheet material.

(V) The Process for the Production of Processed Foods

Figure 4:
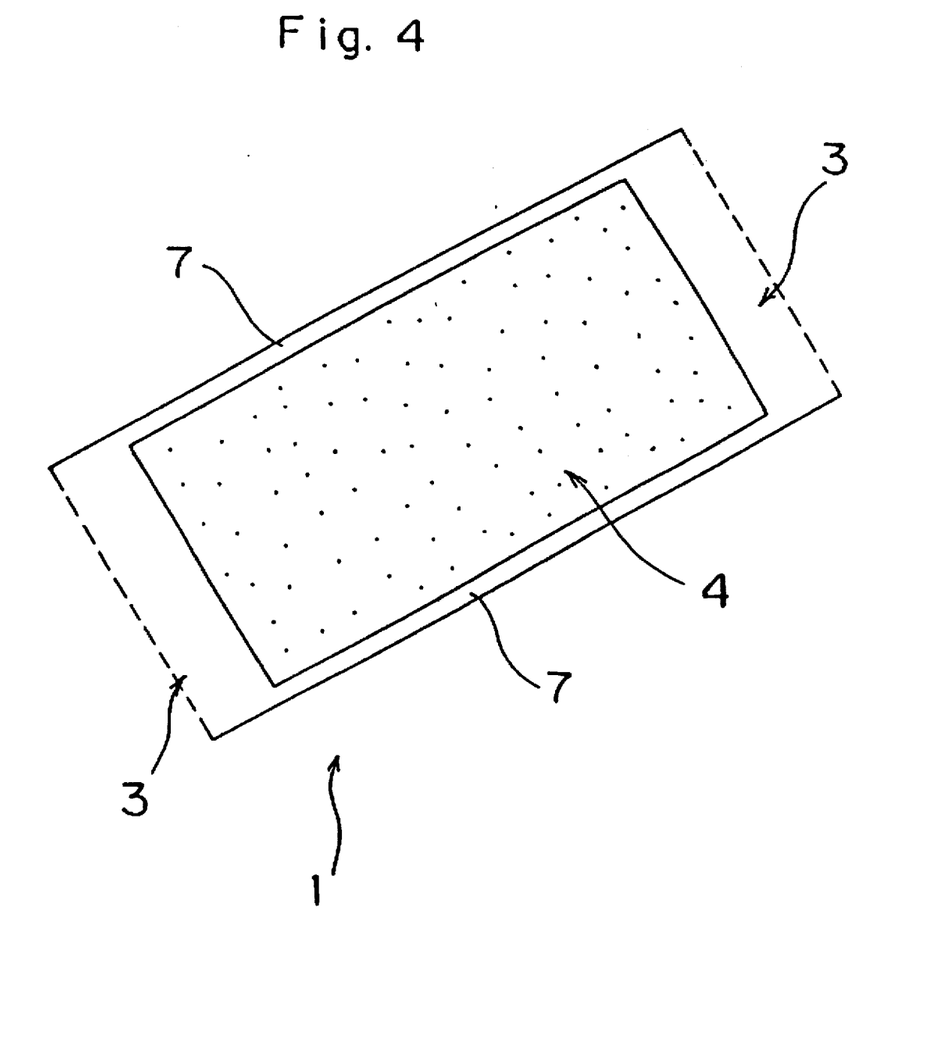
FIG. 4 is a plan view showing one segment of the food component transfer sheet of this invention as cut off in ligation intervals and containing the body of food.
Figure 5:
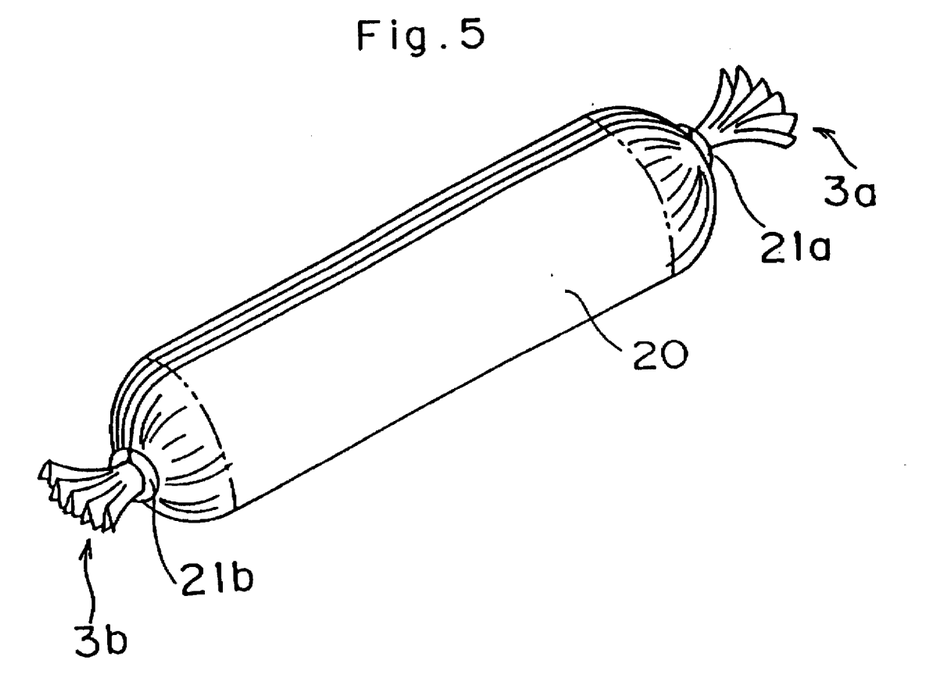
FIG. 5 is a perspective view showing a tubular form of the food component transfer sheet of this invention as filled with a body of food and ligated.
Figure 6:
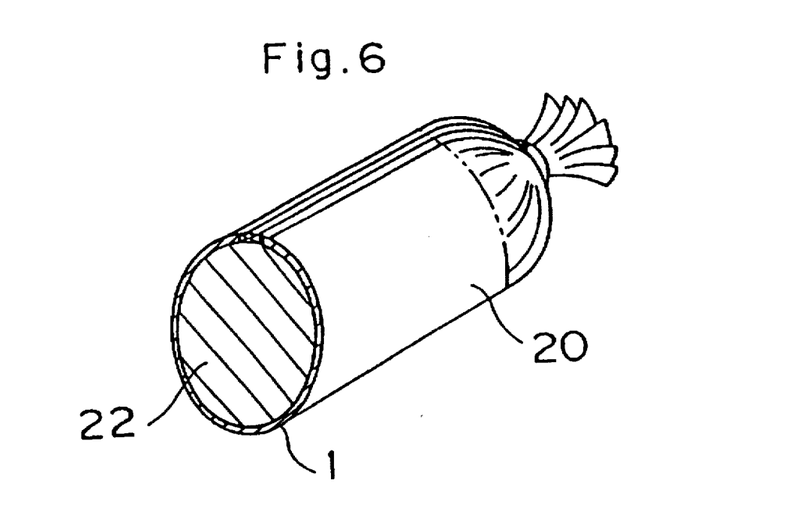
FIG. 6 is a transverse section view of FIG. 5.
Figure 7A:
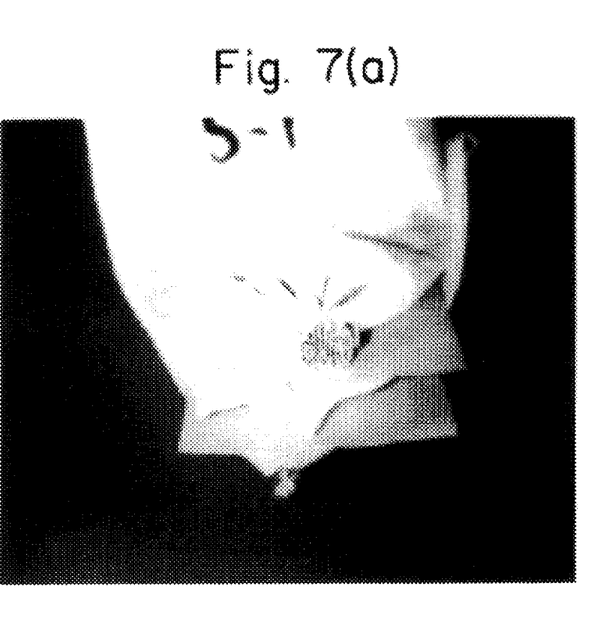
Figure 7B:
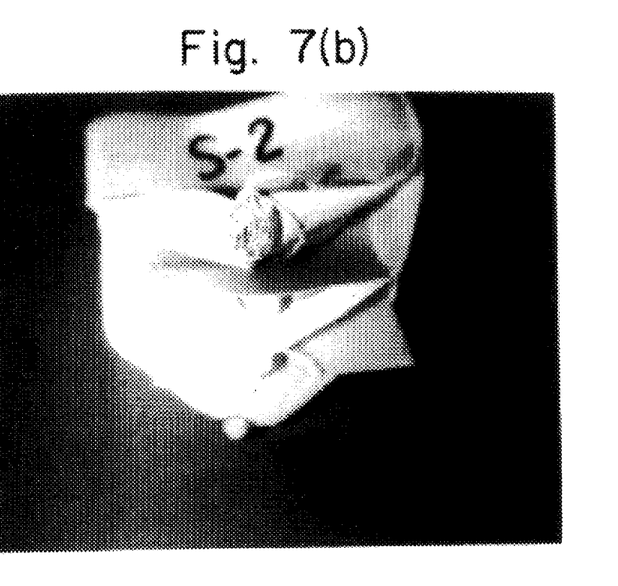
Figure 7C:
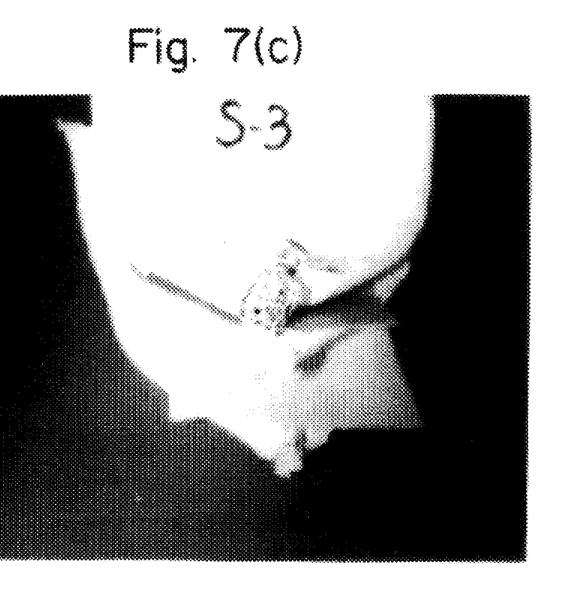
Figure 7D:
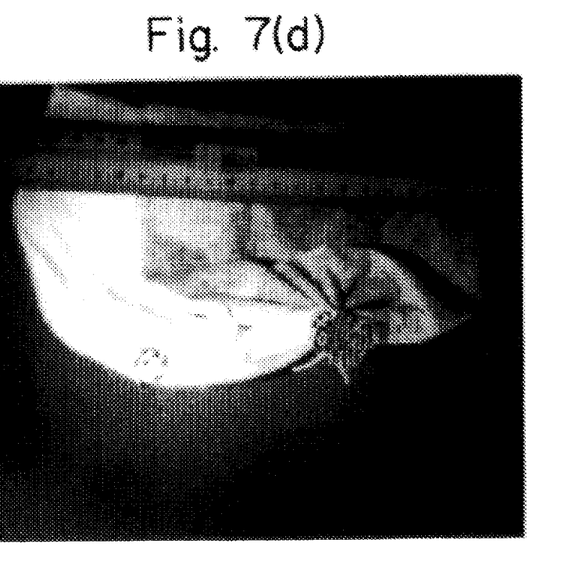

For the production of ham or the like food using the food component transfer sheet of this invention, the transfer sheet 1 is cut in the ligation intervals 3 in the first place as illustrated in FIG. 4. Then, as illustrated in FIGS. 5 and 6, the lateral margins 7 of the sheet 1 are bonded or sewn together to form a tubular casing 20 carrying the food component layer centrally on its inner surface and the ligation interval 3 at either end is gathered. Then, one ligation interval 3a of this tubular casing 20 is mechanically ligated using a known aluminum clip 21a, for instance. Then, a body of food 22, such as seasoned meat, is filled into the casing from the other open end and the corresponding ligation interval 3b is similarly ligated with the same clip 21b as mentioned above in such a manner that the contents of the casing will be held in tightly packed condition. It should be understood that this casing can be easily gathered and clipped with the conventional clipping machine.

The casing 20 thus packed with the body of food 22, e.g. fresh meat, is either set in a retainer or wrapped in a meat net and cooked. After cooking, the transfer sheet 1 is peeled off, leaving the food component adhered to the surface of the body of food 22. Unlike the case with prior art products, the food component has not been transferred to either end of the body of food. Therefore, the ends of the product can be cut off for reuse as the raw material, with the consequent cost advantage.

A cheese wrapped around with a fish meat paste can be produced as follows. A sheet carrying a fish meat paste as the food component layer is placed preferably in a retainer and molten processed cheese is poured. After heat-sterilization, if required, and setting by cooling, the transfer sheet is peeled off.

In the production of a kamaboko item having a food component layer made up of a delicacy, a tubular casing internally carrying a food component layer of such a delicacy, e.g. Parmesan cheese, is filled with a fish meat paste prior to setting thereof and the filled casing is heated to complete gelation of the fish meat paste.

In the transfer sheet of this invention, the food component remains adhered to the base sheet in dry condition due to the presence of a water-soluble glue but when the transfer sheet is placed under humid heat conditions, the food component layer departs from the base sheet and is transferred to the surface of the food.

EXAMPLES

[Example 1]

A food component transfer sheet was manufactured by the process illustrated in FIG. 3. As the base sheet, a rayon cloth (350 mm wide) was used. The running speed of the base sheet was 3,600 mm/min. Using the coating roller 11, the glue solution (12% pullulan solution) was applied on an intermittent basis, as follows (coverage 125 g/m$^2$).

Coating roller contact time:

20 seconds, food component layer length:

1200-1190 mm

Coating roller non-contact time: 2 seconds, ligation interval length: 120- 110 mm Then, using the food component depositor 14, a mixture of spices (pepper, parsley and garlic) as the food component was dusted (200 g/m$^2$). The dusted sheet was passed over a pair of hot rollers (about 100° C.) to fix the spice layer and further passed through a hot air drier (120° C.). The width of the resulting food component transfer sheet was 340 mm, the length of the food component (spice) layer was 1195 mm (mean) and the length of the ligation interval was 115 mm (mean).

This food component transfer sheet was folded into a tubular form with the base sheet 2 outside and sewn into an integral casing with a sewing machine. In this manner, a cylindrical casing measuring 170 mm (tube width)×1,320-1,300 mm (cut length) was provided.

This casing could be easily gathered at the terminal ligation intervals and clipped with aluminum clips (by SY Ringer's J machine) in the same manner as the ordinary plastic film.

[Example 2] (Production of Ham)

The food component transfer sheet manufactured in Example 1 was fabricated, with the base sheet outside, into a tubular casing (100 mm in diameter×300 mm long). After a meat net was sleeved over this casing, the casing was filled with 300 g of ham-seasoned pork and both ends were clipped. This assembly was fed to a smoke house and subjected to a sequence of drying, smoking, steaming and drying. The conditions of respective treatments are shown below in Table 1.

TABLE 1

| Conditions | Steps | | | |
| --- | --- | --- | --- | --- |
| | Drying | Smoking | Steaming | Drying |
| Internal temperature of smoke house (°C.) | 80 | 80 | 85 | 50 |
| Duration of treatment (min.) | 20 | 20 | 60 | 5 |

After the above cooking, the product was cooled in the refrigerator overnight and the base sheet was removed, whereupon a peppered ham carrying deposits of pepper on the surface was obtained.

[Example 3]

A food component transfer sheet was manufactured in the same manner as Example 1 except that a polyethylene terephthalate film (25 μm thick, 300 mm wide) was used as the base sheet, a 25% solution of pullulan as the glue solution was applied at a rate of 40 g/m$^2$, and as the food component, dried particles of herring roe were dusted at a rate of 150 g/m$^2$.

[Example 4]

A food component transfer sheet was manufactured in the same manner as Example 1 except that a polyester non-woven cloth (50 g/m$^2$, 0.5 mm thick, 300 mm wide) was used as the base sheet, a 30% aqueous solution of pullulan as the glue was applied at a rate of 30 g/m$^2$, and as the food component, granulated cheese was dusted at a rate of 70 g/m$^2$.

(Clipping Test)
Test Sheets

In accordance with the procedure described in Example 1, food component transfer sheets were manufactured using the following base sheets 1-3.

Base sheet 1: Elves, a nonwoven fabric manufactured by Unitika Ltd.

Base sheet 2: Betex, a rayon fabric manufactured by Texda, Germany

Base sheet 3: Luxer, a nonwoven fabric manufactured by Asahi Chemical Industry Co., Ltd.

Comparative Test Sheets

Food component transfer sheets were manufactured in the same manner as the test sheets except that the contact of the base sheet with the coating roller was made continuous.

Using these test sheets and comparative test sheets, the ligation workability of the respective food component transfer sheets was evaluated. The results are shown in Table 2.

TABLE 2

| | Comparative Sheet | | Test Sheet | | | | |
|---|---|---|---|---|---|---|---|
| | \multicolumn{7}{c}{Ligation method} |
| | String | | String | | Al clip | | |
| | \multicolumn{7}{c}{Determination point} |
| | x (mm) | y (mm) | x (mm) | y (mm) | x (mm) | y (mm) | FIG. 7 |
| Base sheet S-1 | 18 | 17.5 | 5.5 | 10 | 6 | 7 | a, d |
| Base sheet S-2 | 16.5 | 23 | 6.3 | 12.3 | 8.5 | 9.3 | b |
| Base sheet S-3 | 18.8 | 21 | 7.5 | 12 | 7 | 9.3 | c |
| Ligation workability | Gathering was very difficult. Ligation was also quite difficult | | Gathering was feasible but ligation workability was poor | | The workability of both gathering and ligation was good | | |

Determination point: x and y represent the dimensions at right angles.

Photographs showing the shapes of these ligation parts are presented in FIG. 7 (a)–(d).

FIG. 7 (a) shows the ligation part of the transfer sheet using the base sheet S-1.

FIG. 7 (b) shows the ligation part of the transfer sheet using the base sheet S-2.

FIG. 7 (c) shows the ligation part of the transfer sheet using the base sheet S-3.

Referring to FIG. 7 (a)–(c), the ligation parts, from top to bottom, correspond to the comparative test sheet (string), test sheet (string) and test sheet (aluminum clip), respectively. It is apparent from Table 2 and FIG. 7 that irrespective of the base sheets S-1, S-2 and S-3 used, the ligation parts (x X y) are large in the case of comparative test sheets, while the transfer sheets of the invention are smaller in ligation area and can be easily closed with aluminum clips.

FIG. 7 (d) is an enlarged photograph showing the ligation part of the transfer sheet using the base sheet S-1.

EFFECTS OF THE INVENTION

The food component transfer sheet of this invention has ligation intervals or areas free of deposits of the food component. Therefore, casings fabricated from this sheet can be easily gathered and mechanically clipped using the same clips as those used for the conventional casings so that the production of ham and other food items is much facilitated. Moreover, unlike the conventional products, the ends of the meat product have no deposit of the food component and this is costwise advantageous in that the cut terminal ends of the items can be reclaimed as the raw material.

We claim:

1. A food component transfer for making at least several food casings for transfer of a food component to food enclosed in said casing, said transfer sheet comprising a water and heat resistance base sheet in the form of a continuous ribbon extending in one direction wherein the sheet is of sufficient length to form at least several food casings after ligaturing the sheet into the length of said casings, a layer of said food component to be transferred to said food, said food component being selected from the group consisting of edible granules, powders, chips or mixtures thereof, said layer of food component being coated onto said base sheet repeatedly along the length of said base sheet to form at least several intermittent, spaced food component segments on said base sheet, the space between said intermittent, spaced food component portions being of a length sufficient such that when said food component transfer sheet is segmented to make said casings, enough of said base sheet not coated with said food component exists on said transfer sheet on either side of said food coated portion of said base sheet such that the non-coated opposite ends of said segmented transfer sheet can be both easily closed around a food to form said casing and easily ligatured to secure the closed casing and a glue layer made of an edible, water-soluble macromolecular substance disposed between said base sheet and said food component layer and releasably adhering said food component layer to said base sheet.

2. The food component transfer sheet according to claim 1 wherein said base sheet is gas-permeable.

3. The food component transfer sheet according to claim 1 wherein said glue layer is comprised of a naturally-occurring polysaccharide.

4. The food component transfer sheet according to claim 1 wherein said food component is a spice.

5. The food component transfer sheet according to claim 1 wherein said base sheet is tubular.

6. A process for producing a food item comprising (i) enclosing a body of seasoned food in a cut segment of the food component transfer sheet claimed in claim 1, (ii) ligating the both ends of said segment of the transfer sheet with clips to package both the body of seasoned food in tightly packed condition, (iii) subjecting the transfer sheet enclosed body of seasoned food to a humid hot environment, and then (iv) peeling the transfer sheet from said body of food.

7. The process according to claim 6 wherein said body of seasoned food is selected from the group consisting of a poultry meat, an animal meat, a fish meat and mixtures thereof.

* * * * *